United States Patent
Qiu et al.

(10) Patent No.: US 10,241,525 B2
(45) Date of Patent: Mar. 26, 2019

(54) THERMOSTATIC VALVE

(71) Applicant: Zhejiang Sanhua Automotive Components Co., Ltd., Hangzhou, Zhejiang (CN)

(72) Inventors: Haoming Qiu, Zhejiang (CN); Bin Yin, Zhejiang (CN); Xiaojun Qian, Zhejiang (CN)

(73) Assignee: Zhejiang Sanhua Automotive Components Co., Ltd., Hangzhou, Zhejiang (CN)

( * ) Notice: Subject to any disclaimer, the term of this patent is extended or adjusted under 35 U.S.C. 154(b) by 395 days.

(21) Appl. No.: 15/015,450

(22) Filed: Feb. 4, 2016

(65) Prior Publication Data

US 2016/0224037 A1    Aug. 4, 2016

(30) Foreign Application Priority Data

Feb. 4, 2015   (CN) .......................... 2015 1 0058042
Jan. 20, 2016  (CN) .......................... 2016 1 0039674

(51) Int. Cl.
*G05D 23/185*   (2006.01)
*F01M 5/00*      (2006.01)
(Continued)

(52) U.S. Cl.
CPC ......... *G05D 23/1852* (2013.01); *F01M 5/007* (2013.01); *G05D 16/106* (2013.01);
(Continued)

(58) Field of Classification Search
CPC .. F01M 5/002; F01M 5/007; Y10T 29/49826; F16H 57/0417; F16H 57/0435
See application file for complete search history.

(56) References Cited

U.S. PATENT DOCUMENTS 8,141,790 B2 *   3/2012   Sheppard ................. F01P 7/16
                                                        236/100
2006/0016900 A1*  1/2006   Brown ................... F01M 5/007
                                                        236/34.5
(Continued)

FOREIGN PATENT DOCUMENTS

CN     102359577 A    2/2012
CN     103133740 A    6/2013
(Continued)

OTHER PUBLICATIONS

Chinese Office Communication for Application No. CN 201610039674.1 dated Jul. 19, 2017.
(Continued)

*Primary Examiner* — Jonathan Bradford
(74) *Attorney, Agent, or Firm* — Wolf, Greenfield & Sacks, P.C.

(57) ABSTRACT

A thermostatic valve is provided according to the present application. In the thermostatic valve, a relief ring movable upward and downward is provided in a cavity of a valve body. Under normal conditions, the relief ring abuts against a step on an inner wall of the cavity or another fixing portion via an elastic element, and the cavity is further provided therein with a first passage which can be opened or closed by upward or downward moving of the relief ring. In the case that the fluid pressure in the thermostatic valve is excessively large, the fluid can push the relief ring to compress the elastic element, thus the first passage in the relief ring is opened, and the first flow passage and the third flow passage may simultaneously allow circulation of the fluid, thereby may prevent damage caused by an excessively large fluid pressure in the thermostatic valve.

21 Claims, 8 Drawing Sheets

(51) Int. Cl.
*G05D 16/10* (2006.01)
*F01P 7/16* (2006.01)
*F16H 57/04* (2010.01)

(52) U.S. Cl.
CPC ............ *G05D 23/1856* (2013.01); *F01P 7/16* (2013.01); *F16H 57/0413* (2013.01)

(56) References Cited

U.S. PATENT DOCUMENTS

| | | |
|---|---|---|
| 2010/0126594 A1 | 5/2010 | Sheppard |
| 2010/0216594 A1 | 5/2010 | Sheppard |
| 2015/0185738 A1 | 7/2015 | Qiu et al. |

FOREIGN PATENT DOCUMENTS

| | | |
|---|---|---|
| CN | 103573993 A | 2/2014 |
| CN | 103574265 A | 2/2014 |
| CN | 103851169 A | 6/2014 |
| EP | 2884134 A1 | 6/2015 |
| WO | WO 2014/023157 A1 | 2/2014 |

OTHER PUBLICATIONS

Extended European Search Report, dated Jul. 22, 2016, from related European Application No. 16154111.5.

\* cited by examiner

THERMOSTATIC VALVE

CROSS REFERENCE OF RELATED APPLICATION

The present application claims the priority to Chinese Patent Application No. 201510058042.5, titled "THERMOSTAT", filed on Feb. 4, 2015, and Chinese Patent Application No. 201610039674.1, titled "THERMOSTAT", filed on Jan. 20, 2016, with the State Intellectual Property Office of the People's Republic of China, the contents of which are incorporated herein by reference in its entirety.

FIELD

The present application relates to the field of fluid control, and more particularly to a thermostatic valve.

BACKGROUND

During a driving process of an automobile, lubrication is required to be timely provided between various components using a lubricating oil, to ensure a normal operation of the automobile. If the lubricating oil does not have a good lubricating property, a service life of the automobile may be adversely affected. The lubricating property of the lubricating oil is much associated with a temperature of the lubricating oil, and when the temperature of the lubricating oil is excessively high or excessively low, the lubricating property of the lubricating oil may be adversely influenced.

The temperature of the lubricating oil generally may be not too high when the automobile is normally driving. In the case that the automobile is overloaded or a four-wheel drive mode thereof is set to drive in snow or cross-country, the automobile drives in a state that a hydraulic torque converter slips excessively, which may cause the temperature of a transmission oil to be excessively high, thus losing the lubricating property.

At present, a temperature adjustment function for the transmission oil is mainly realized by a cooling flow passage formed by a thermostatic valve and an external cooling device. In the case that the temperature of a transmission oil passage rises, a heat sensitive material of a thermostatic actuating element expands due to being heated, and a passage for the transmission oil directly flowing back to a gearbox is blocked, thus the oil with a high temperature enters the external cooling device to be cooled and then flows back to the gearbox. On the contrary, in the case that the temperature of the oil is too low, the heat sensitive material of the thermostatic actuating element begins to solidify and shrink, and a piston is reset, the passage for the transmission oil directly flowing back to the gearbox is opened. The oil in the oil passage of the gearbox exchanges heat with a heat generating element of the gearbox during the flowing process, to control the temperature of the oil within an appropriate range.

However, in the practical using process, in the case that the external cooling device is blocked to cause a pressure of the cooling oil to be over high, the problem of a supply shortage of the transmission cooling oil may also be caused.

SUMMARY

To avoid the situation that the fluid pressure of the cooling oil is excessively high due to blockage of an external cooling device, a thermostatic valve is provided according to a technical solution of the present application. The thermostatic valve includes a valve body with a cavity being provided in the valve body, a thermostatic actuating element and a first elastic element which are mounted in the cavity, with an end of the thermostatic actuating element being supported on the first elastic element; the valve body is at least provided with three ports, and the three ports includes a first port, a second port, and a third port, the cavity is further provided therein with a first valve seat, an outer diameter of the first valve seat is smaller than an inner diameter, at a portion corresponding to the first valve seat, of the cavity, and there is a distance between at least one portion of the first valve seat and an inner wall of the cavity, the cavity is further provided therein with a relief ring and a second elastic element, one end of the second elastic element abuts against the relief ring, and at least one first passage can be formed between the first valve seat and the relief ring, or between the inner wall of the cavity and the relief ring, the thermostatic valve opens and closes the first passage by the relief ring, and in the case that the first passage is opened, the thermostatic valve forms a third flow passage, and the third flow passage includes the first port, the first passage and the third port.

The thermostatic valve further includes a first valve opening provided at the first valve seat, the thermostatic valve has the first valve opening opened and closed by the thermostatic actuating element, and in the case that the thermostatic actuating element opens the first valve opening, the second flow passage allows circulation of fluid, and the second flow passage includes the first port, the first valve opening and the third port.

By providing the relief ring, which is movable under the action of the differential pressure, and further the elastic element abutting against the relief ring in the cavity of the valve body, and further the first passage which can be opened or closed by upward or downward moving of the relief ring is provided in the cavity, under normal conditions, the pressure relief valve closes the first passage, and in the case that the fluid differential pressure of the thermostatic valve is increased to reach a preset value, the fluid can push the relief ring to compress the elastic element, the relief ring moves to open the first passage, thus the first passage and the third passage may simultaneously allow circulation of fluid, which may avoid damage caused by an excessively large fluid pressure of the system.

DETAILED DESCRIPTION

Figure 1:
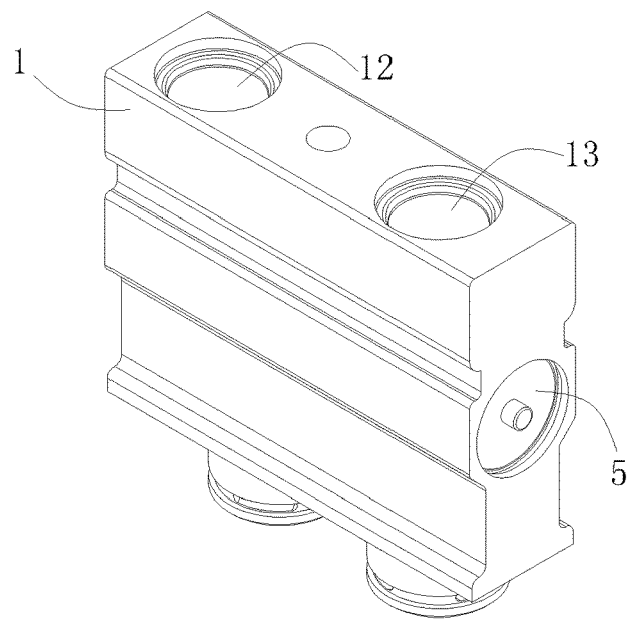
FIG. 1 is a perspective schematic view of a thermostatic valve according to an embodiment of the present application.

A thermostatic valve is provided in the technical solutions of the present application. In a cavity of a valve body of the thermostatic valve, a relief ring movable under the action of a differential pressure, and further an elastic element abutting against the relief ring are provided in a cavity of a valve body, to allow an action force of the elastic element to the relief ring to be opposite to an action force of the differential pressure to the relief ring, and a first passage which can be opened or closed by upward and downward moving of the relief ring is further provided in the cavity. In normal conditions, the relief ring closes the first passage, and in the case that a fluid pressure of the thermostatic valve reaches a preset value, the fluid can push the relief ring to compress the elastic element, thus the first passage is opened, and the first passage and the third passage can simultaneously allow circulation of the fluid, which may avoid damage caused by an excessively large fluid pressure of the system.

An initial deformation force described in this specification refers to a pressure acted on an elastic element, which is in a compressed condition when a product is not used, in the case that an external force acts on the elastic element and the elastic element tends to deform.

The technical solutions are specifically illustrated in conjunction with drawings and embodiments, and the locality terms such as "top", "bottom", "left", "right" mentioned in this specification are each set forth according to respective locality relationship in the drawings.

An embodiment is shown in FIGS. 1 to 7. A thermostatic valve includes a valve body 1 being provided therein with a cavity 15, and a thermostatic actuating element mounted in the cavity 15. One end of the cavity 15 is open, and the thermostatic actuating element is inserted into the cavity 15 via an open end 150 of the cavity 15. The valve body 1 is further provided with a first port 11, a second port 12, a fourth port 13 and a third port 14, each of which may be in communication with an external and the cavity 15. The first port 11 and the second port 12 may be arranged at positions opposite to each other in the valve body, and the fourth port 13 and the third port 14 may be arranged at positions opposite to each other in the valve body.

It should be noted herein that, the third port or the fourth port 13 may also not be provided, and the thermostatic actuating element may be inserted into the cavity through a third flow passage. In this embodiment, arranging of the fourth port and the third port may facilitate the connecting and mounting of pipelines of the thermostatic valve.

The cavity 15 here refers to a cavity formed by a series of drill holes in the valve body 1, and components and parts may be arranged and mounted in the cavity.

The thermostatic actuating element includes a thermostatic actuating element body, a piston 21, and a heat sensitive material filled in the thermostatic actuating element body. The heat sensitive material has a volume changeable with a change of the temperature, and a volume change of the heat sensitive material pushes the piston 21 to move, thus can prompt a relative movement between the thermostatic actuating element body and the piston.

An auxiliary cavity 155 is also provided in an upper end of the valve body 1, a bottom portion of the auxiliary cavity 155 and a top wall of the cavity 15 are arranged oppositely to each other, and a hole 156 is provided between the bottom portion of the auxiliary cavity 155 and the top wall of the cavity 15. A top portion of the piston 21 of the thermostatic actuating element may extend from the cavity into the auxiliary cavity 155 via the hole. In a direction of the auxiliary cavity 155 towards the cavity 15 or in a direction from an open end of the auxiliary cavity to an inside, a sealing cover 8, a third elastic element 33, and a spring seat 9 are provided in order in the auxiliary cavity 15. The sealing cover 8 is arranged to be fixed with respect to the valve body, and the sealing cover 8 and the valve body may be sealed with respect to each other by a sealing ring. The spring seat 9 is of a cap-shaped structure, and the spring seat 9 is sleeved on an end of a top portion, extending into the auxiliary cavity 155, of the piston 21, and the end of the top portion, extending into the auxiliary cavity 155, of the piston 21 is located in an inner cavity of the spring seat. The third elastic element 33 has one end abutting against the sealing cover 8, and another end abutting against an outer edge of the spring seat 9. The third elastic element 33 is in a compressed state at this moment.

It should be noted herein that, the piston may directly abut against the third elastic element 33, for example, the spring seat is formed integrally with the piston, or the third elastic element is sleeved on the piston.

The sealing cover 8 and the valve body may be fixed to each other by screw threads, or may be fixed with respect to each other by a snap ring.

Another end of the thermostatic actuating element is supported on a first elastic element 31, thus allowing the thermostatic actuating element to be mounted into the cavity 15, and enabling the thermostatic actuating element to control the flowing of the fluid in the thermostatic valve. It should be noted herein that, the piston 21 is in a clearance fit with the hole, and the piston 21 is slidable within a certain range along the hole. The thermostatic actuating element body moves downward, and the hole may provide a guiding and positioning function and restricts a dislocation of the thermostatic actuating element during the moving process.

The cavity 15 includes a first cavity 151 in communication with the second port 12, a second cavity 152 in communication with the first port 11, and a third cavity 153. The first cavity 151 has an inner diameter smaller than an inner diameter of the second cavity 152, and a second valve opening 154 is further provided between the first cavity 151 and the second cavity 152. The inner diameter of the second cavity 152 is smaller than an inner diameter of the third cavity 153. The second cavity 152 is closer to the first port 11 than the third cavity 153. The first port is in communication with the space where the second cavity is located, and the space where the third cavity is located is in communication with the third port. A step 1533 is formed between the second cavity 152 and the third cavity 153. The third cavity 153 is in communication with the fourth port 13 and the third port 14, and a height of the third cavity 153 is greater than an inner diameter of the fourth port 13 or an inner diameter of the third port 14. A portion of the third cavity 153 is located above the fourth port 13 and the third port 14, or in other words, a portion of the third cavity 153 is located between the third port 14 and the first port 11 when viewed in an axial direction.

It is to be noted here that, the second valve opening may also be implemented by other ways. For example, a cut-off circle being provided with the second valve opening is fixedly mounted at a connection portion of the first cavity and the second cavity, and the inner diameter of the first cavity may be the same or different with the inner diameter of the second cavity herein.

Figure 5:
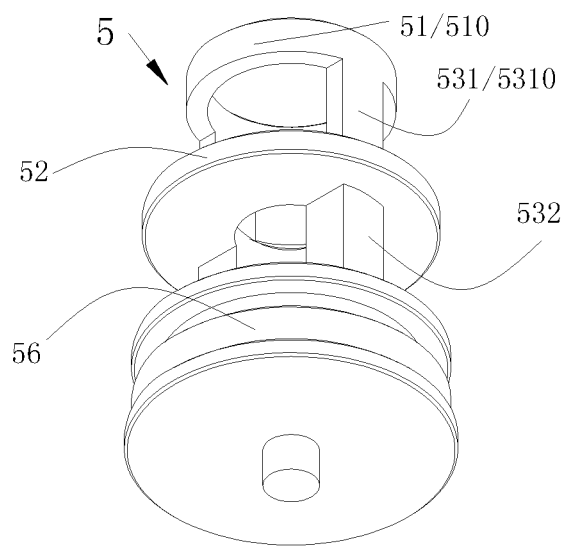
FIG. 5 is a perspective schematic view of a cap in the thermostatic valve in FIG. 1.
Figure 6:
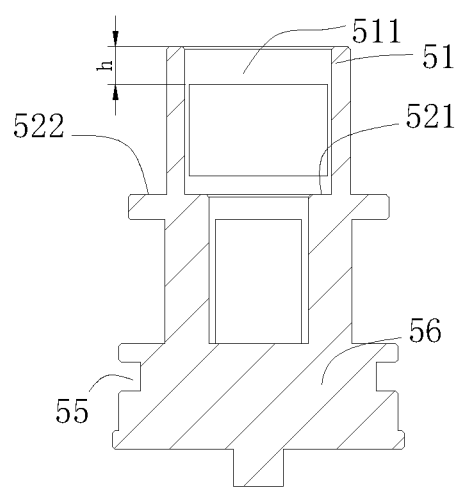
FIG. 6 is a sectional schematic view of the cap in FIG. 5.
Figure 7:
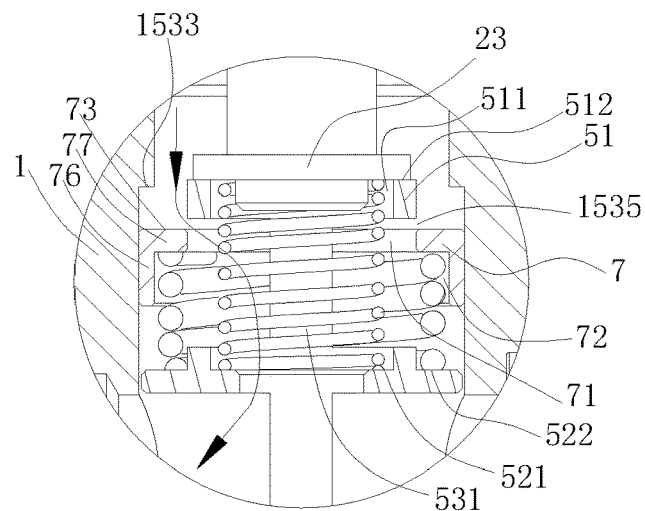
FIG. 7 is a partially enlarged schematic view of FIG. 4.

The third cavity 153 is provided with a cap 5 configured to seal the open end of the cavity 15. In this embodiment, the cap 5 extends into the third cavity 153 and is fixed by a snap ring 6, and moreover the cap 5 may also be fixed by screw threads. As shown in FIGS. 5 and 6, the cap 5 includes a first valve seat 51, a supporting seat 52, and a cap main body 56. At least one first connecting column 531 is further provided between the first valve seat 51 and the supporting seat 52. The first connecting column 531 functions as a first connecting portion between the first valve seat 51 and the supporting seat 52. The first connecting portion is not limited to a column structure, and may also be of other structures. At least one second connecting column 532 is further provided between the supporting seat 52 and the cap main body 56, and the second connecting column 532 functions as a second connecting portion between the supporting seat 52 and the cap main body 56. The first valve seat 51 is substantially of an annulus structure, a cross section of each of the at least one first connecting column 531 may be a part of the annulus, and in this embodiment, a peripheral surface 5310 of each of the first connecting column 531 and a peripheral surface 510 of the first valve seat have the same outer diameter or are smoothly transited. Or the first valve seat 51 and the first connecting column 531 are originally portions of the same hollow cylinder, and each of the first connecting column 531 is formed by removing a partial wall portion between adjacent first connecting columns of the hollow cylinder. It should be noted herein that, the first valve seat 51 and the at least one supporting seat 52 may also be separately arranged in the third cavity. In this embodiment, the first valve seat 51, the supporting seat 52 and the cap main body 56 are formed integrally, and the first valve seat 51, the supporting seat 52 and the cap main body 56 are connected by the connecting columns. The at least one first connecting column functions as the connecting portion connected between the first valve seat and the supporting seat, and the at least one second connecting column functions as the connecting portion connected between the cap main body and the supporting seat, thus facilitating manufacture and installation, and having less procedures and a high precision.

The first valve seat 51 includes a main body having a through passage, and a first valve opening 511 located at a top of the through passage. A height of the first valve seat 51 is less than a compressible stroke of the second elastic element 32. The supporting seat 52 may be configured to support multiple elastic elements, and the elastic elements may be supported on an upper end surface of the supporting seat 52. The upper end surface of the supporting seat 52 includes a first supporting surface 521 and a second supporting surface 522, each of which is of an annular structure. The first supporting surface 521 is located at an inner side of the upper end surface, the second supporting surface 522 is located at an outer side of the upper end surface, and the at least one first connecting column 531 is arranged between the first supporting surface 511 and the second supporting surface 522. The at least one first connecting column 531 not only connects the first valve seat 51 and the supporting seat 52, but also may limit a displacement of the first elastic element 31 supported on the first supporting surface 521, and a displacement of the second elastic element 32 supported on the second supporting surface 522, and furthermore, allows the first elastic element 31 and the second elastic element 32 to not interfere with each other during operation, thus allowing the operation of the product to be reliable. For increasing a flowing property of the fluid, and decreasing a flow resistance of the fluid, the supporting seat 52 is further provided with a through hole running through an upper end surface.

The cap main body 56 includes a main body, and the main body is configured to seal the open end of the cavity 15. At least one sealing ring accommodating groove 55 is further provided at a periphery side of the main body of the cap main body 56. In this way, a sealing ring may be provided between the cap 5 and the valve body 1 to improve a sealing performance between the cap 5 and the valve body 1 when the cap 5 is mounted to the valve body 1.

In the thermostatic valve, the open end of the cavity 15 is sealed by mounting the cap 5, the cap 5 here is arranged in the third cavity 153, and an outer wall of the cap main body 56 is in a clearance fit with an inner wall at a side corresponding to the open end, of the third cavity 153. A sealing ring may further be provided between the cap main body 56 and the third cavity 153, to improve the sealing performance and avoid outleakage. The first valve seat 51 and the supporting seat 52 are located at a portion, above the fourth port 13 and the third port 14, of the third cavity 153. The at least one second connecting column 532 is substantially located at a position between the fourth port 13 and the third port 14, and a through passage of the supporting seat 52 may be in communication with both the fourth port 13 and the third port 14. The first valve seat 51 may be provided in a position where the third cavity 153 is close to the second cavity 152, or at least one portion of the first valve seat 51 is located in the second cavity 152, and a first passage may be formed between the first valve seat 51 and the third cavity 153.

For reducing the flow resistance of the fluid, a certain distance is maintained between an outer wall of the supporting seat 52 and the inner wall of the third cavity 153, and the fluid may flow to the third port 14 via a space between the outer wall of the supporting seat 52 and the inner wall of the third cavity 153.

A relief ring 7 is further provided at a portion of the third cavity 153 above the fourth port 13 and the third port 14, and the relief ring 7 is of a hollow cylindrical structure, or is of a cylindrical structure mounted upside-down with a through hole in a bottom portion thereof. A communicating hole 71 is provided in a bottom portion of the relief ring 7. The relief ring 7 is further provided with a spring receiving portion 72, and the spring receiving portion 72 has an inner diameter greater than an inner diameter of the communicating hole 71. In an axial direction of the thermostatic actuating element, an upper end portion 512, facing towards the thermostatic actuating element, of the first valve seat 51 protrudes above a top portion 73 of the bottom portion, facing towards the thermostatic actuating element, of the relief ring 7. In this way, the cooperation between the first valve seat and the thermostatic actuating element is relatively simple.

The relief ring 7 is in a clearance fit, or in a sliding fit with the third cavity 153, and the relief ring 7 may slide upwards and downwards along the inner wall of the third cavity 153 by a certain stroke under the action of a differential pressure and the first elastic element. The relief ring 7 has an outer diameter greater than an inner diameter of the second cavity 152, and an inner diameter of the communicating hole 71 is less than the inner diameter of the second cavity 152. The communicating hole 71 is in a clearance fit or in a sliding fit with the first valve seat 51, and an outer diameter of the first connecting column is the same as an outer diameter of the first valve seat, thus the outer wall of the first valve seat 51 and the outer wall of the first connecting column also provide a guiding function for the upward and downward sliding of the relief ring 7, and with the moving of the relief ring 7, the communicating hole 71 may be opened or closed. Here, the relief ring 7 should keep a certain coaxiality degree with the third cavity 153, to ensure that the relief ring 7 is smoothly movable upward and downward along the third cavity 153. Further, the relief ring 7 should keep a certain coaxiality degree with the first valve seat 51. A height H1 of the first valve seat in cooperation with the relief ring is less than a compressible stroke of the second elastic element, and is also less than a slidable stroke H2 of the relief ring along the inner wall of the third cavity. In this way, the relief ring may leave the first valve opening to form the first passage.

All or at least a part of the relief ring, at least a part of the first valve seat, and at least a part of the second elastic element are arranged in the third cavity. In the case that the relief ring abuts against the step, the third flow passage does not allow circulation of the fluid. In the case that the relief ring abuts against the step, the relief ring is sleeved on the first valve seat, and in the case that a differential pressure between an upper side pressure and a lower side pressure of the relief ring allows a pressure exerted on the relief ring to exceed an elastic force of the second elastic element, the relief ring moves towards the direction of the third port, and allows the bottom portion of the relief ring to leave the first valve seat, thus a third flow passage allows circulation of fluid, and the first port is in communication with the third port via the first passage 1535 and the communicating hole 71.

The relief ring 7 is supported by the second elastic element 32 and the step 1533 in the third cavity 153. The second elastic element 32 has one end abutting against a bottom portion of the spring accommodating cavity 72 of the relief ring 7, and another end abutting against the second supporting surface 522 of the supporting seat 52 of the cap 5. In normal conditions, the second elastic element 32 is in a compressed state, to allow an outer bottom surface of the relief ring 7 to abut against the step 1533, and the first passage 1535 and the communicating hole 71 are in a closed state.

In the case that the relief ring 7 compresses the second elastic element 32 under the action of an external force (for example, a fluid pressure), the relief ring 7 moves downward along the inner wall of the third cavity 153 and the outer wall of the first valve seat 51 till the communicating hole 71 of the relief ring 7 is completely disengaged from the outer wall of the first valve seat 51, the communicating hole 71 is opened, and the first passage 1535 allows circulation of the fluid.

Figure 10:
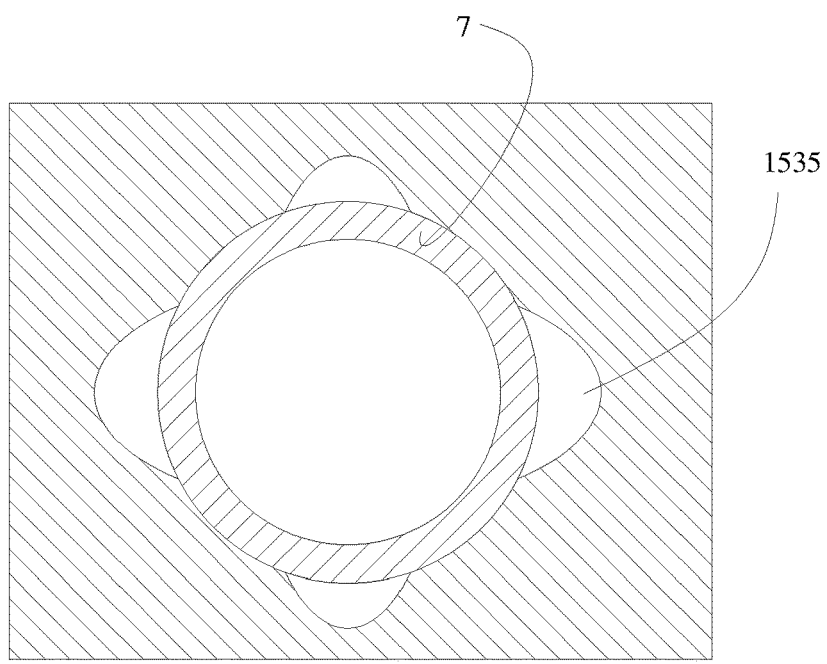
FIG. 10 is a partially sectional schematic view of a thermostatic valve according to another embodiment of the present application taken along a part of a relief ring.

Besides, the first passage may also be in other forms, as shown in FIG. 10, the third cavity 153 may further be provided with at least one through recess 1532, and there is a distance between a wall portion of the recess 1532 and the outer diameter of the relief ring 7. Inner diameters of other parts, excluding the recess 1532, of the third cavity are in a clearance fit with the relief ring 7 to generate a guidance for sliding, and multiple bypass passages may also be formed between the recess and the outer wall of the relief ring 7. Thus, when the relief ring 7 compresses the second elastic element 32 under the action of an external force (for example, a fluid pressure), the outer bottom portion of the relief ring 7 is disengaged from the step 1533, and the first passage 1535 is opened. Of course, the first passage 1535 may also be opened when the relief ring 7 moves downward by a certain distance after the outer bottom surface of the relief ring 7 is disengaged from the step 1533. In addition, the recess may also be arranged in the outer wall portion of the relief ring, and similarly the first passage 1535 may be formed between the inner wall portion of the third cavity and the recess of the relief ring 7.

Moreover, the relief ring does not necessarily abut against the step between the second cavity and the third cavity. A step-shaped out extending portion may be provided on the first valve seat, and the relief ring abuts against a stepped surface of the outer extending portion.

Thus, the first flow passage includes the first port 11, the second valve opening 154, and the second port 12; the second flow passage includes the first port 11, the first valve opening 511, and the third port 14; a fourth flow passage includes the fourth port 13, at least one part of the third cavity 153, and the third port 14; and the third flow passage includes the first port 11, the first passage 1535, and the third port 14.

In the above embodiments, a large part of the thermostatic actuating element body is arranged in the second cavity 152, and the heat sensitive material in the thermostatic actuating element body senses a temperature through the thermostatic actuating element body. In this way, no matter the fluid flows through the first flow passage, the second flow passage, or the third flow passage, thermostatic actuating element body is allowed to be sufficiently in contact with the fluid in the case that the fluid flows from the first port 11, thus the thermostatic actuating element can exactly sense the temperature of the fluid, and timely respond.

The thermostatic actuating element includes a first sealing portion 25 relatively close to the piston, a second sealing portion 23 relatively away from the piston, and a middle portion 22 between the first sealing portion 25 and the second sealing portion 23. An outer diameter of the middle portion 22 is smaller than an outer diameter of the second sealing portion 23. An outer diameter of the first sealing portion 25 is greater than an inner diameter of the second valve opening 154, and the first sealing portion 25 can close the second valve opening 154. An outer diameter of the second sealing portion 23 is greater than an inner diameter of the first valve opening 511, and the second sealing portion 23 can close the first valve opening 511. It should be noted that, the first sealing portion 25 and the second sealing portion 23 may be formed integrally with an outer wall of the thermostatic actuating element body, and may each be of a combined structure fixed to the outer wall of the thermostatic actuating element body. In this embodiment, the first sealing portion 25 is one part of the thermostatic actuating element body, that is, the first sealing portion 25 and the thermostatic actuating element body are formed integrally, and the second sealing portion 23 is fixedly mounted on the outer wall of the thermostatic actuating element body.

One end of the first elastic element 31 is sleeved on an end portion of the thermostatic actuating element body, and abuts against the second sealing portion 23. Besides, the first elastic element 31 may also press against an end surface of the second sealing portion 23. Another end of the first elastic element 31 passes through the communicating hole 71 and abuts against the first supporting surface of the supporting seat 51. The first elastic element 31 is partitioned from the second elastic element 32 by the first connecting portion 531. The first elastic element 31 is in a compressed state, and when the temperature is low, the thermostatic actuating element, under the action of the elastic force of the first elastic element 31, may allow the first sealing portion 25 to close the second valve opening 154.

The initial deformation force of the first elastic element 31 is smaller than the initial deformation force of the third elastic element 33, and the initial deformation force of the third elastic element is greater than an elastic force generated by a deformation of the first elastic element when the thermostatic actuating element contacts and shuts off the first valve opening.

The thermostatic valve according to the above technical solution may respectively shut off one of the first flow passage and the second flow passage by the movement of the thermostatic actuating element, and regulate a circulation state of the first flow passage and a circulation state of the second flow passage according to the temperature of the fluid, which may keep the temperature of the fluid in the system within a relatively constant range.

Figure 2:
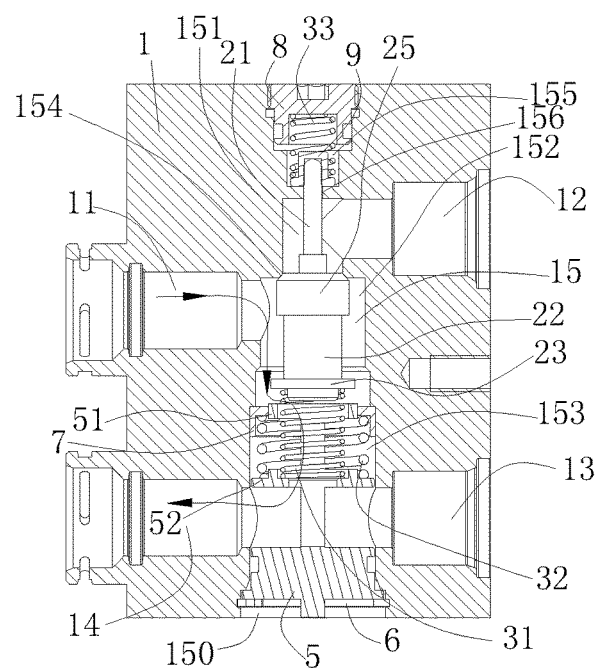
FIG. 2 is a sectional schematic view of the thermostatic valve in FIG. 1 in the case a second flow passage allows circulation of fluid.

As shown in FIG. 2, in the case that the temperature of the fluid is low, the heat sensitive material in the thermostatic actuating element contracts, and the thermostatic actuating element body moves towards the second valve opening 154 under the action of a restoring force of the first elastic element 31, until the first sealing portion 25 closes the second valve opening 154, and at this moment the thermostatic actuating element is in a first cut off position, the first flow passage is cut off, and the second flow passage allows circulation of the fluid.

Figure 3:
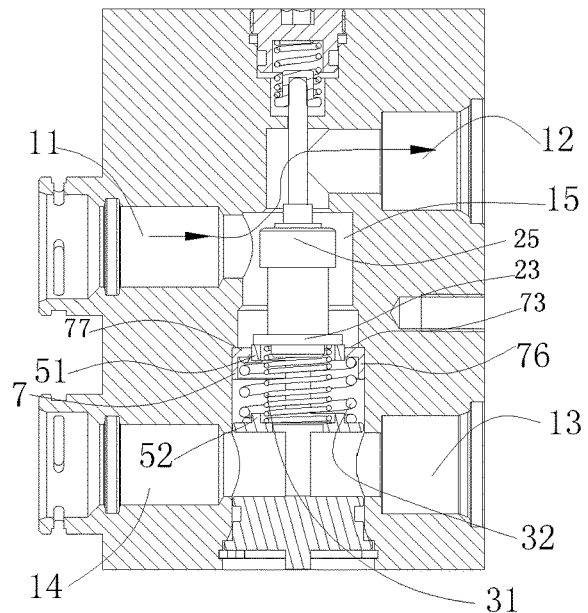
FIG. 3 is a sectional schematic view of the thermostatic valve in FIG. 1 in the case that a first flow passage allows circulation of fluid.

As shown in FIG. 3, in the case that the temperature of the fluid is high, the heat sensitive material in the thermostatic actuating element expands, and the heat sensitive material pushes the piston 21 to move. Since the initial deformation force of the third elastic element 33 is greater than the initial deformation force of the first elastic element 31, the thermostatic actuating element body moves towards the first valve opening 511, and compresses the first elastic element 31, and the second sealing portion 23 closes the first valve opening 511. The thermostatic actuating element at this moment is in a second cut off position, the first flow passage allows circulation of the fluid, and the second flow passage is cut off.

In the case that the second sealing portion 23 is in contact with the first valve opening 511, the initial deformation force of the first elastic element 31 at this moment is less than an expansion force of the thermostatic actuating element, and the initial deformation force of the third elastic element 33 is greater than or equal to an elastic force of deformation of the first elastic element 31 when the second sealing portion 23 tightly presses and closes the first valve opening 511. The temperature of the fluid in the thermostatic valve is in a dynamic change, and if an effective working temperature range of the fluid in the thermostatic valve is large, a pushing force generated by the thermostatic actuating element may also have a large range. If a stroke of the thermostatic actuating element closing the first valve opening 511 maintains unchanged, the thermostatic actuating element may be damaged. For preventing the thermostatic actuating element from being damaged, and enlarging the effective working temperature range of the thermostatic valve, in the case a difference value between the pushing force generated by the heat sensitive material and the elastic force of the first elastic element 31 is greater than a first preset value, the piston 21 here moves upward to compress the third elastic element 33, to allow the spring seat 9 to move upward by a certain distance, to further enlarge the stroke of the thermostatic actuating element, or compensate a damping of the stroke of the thermostatic actuating element, or compensate an error generated in the technological process, thus improving an endurance performance of the product.

Figure 4:
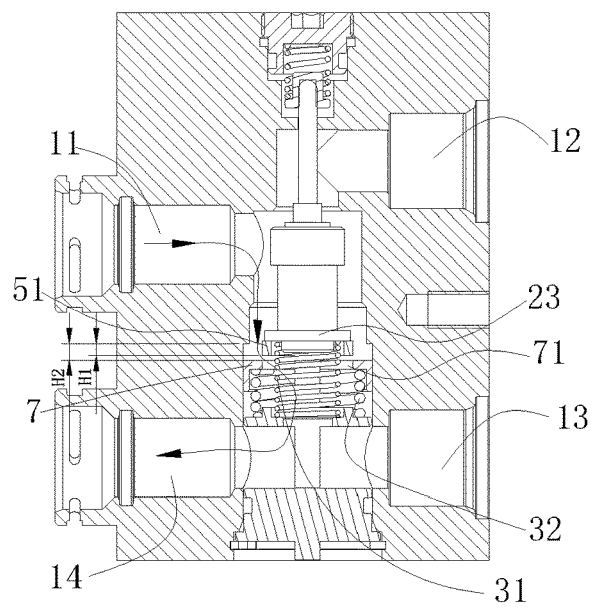
FIG. 4 is a sectional schematic view of the thermostatic valve in FIG. 1 in the case that a bypass passage allows circulation of fluid.

As shown in FIG. 4, in the case that the thermostatic actuating element is in the second cut off position, the first flow passage allows circulation of fluid, and the second flow passage is cut off. In the case that a fluid pressure in the thermostatic valve is excessively large, and is still continuously increasing, the system may be in danger, thus may cause a lubricating performance of the system to be degraded, or other components to be damaged, therefore a pressure relief device is required to be provided.

Since the inner diameter of the communicating hole 71 is less than the inner diameter of the second cavity 152, the relief ring 7 can open or close the first passage 1535. A part of the annular outer bottom surface, facing towards the second cavity 152, of the relief ring 7 may be in contact with the fluid in the second cavity. If the fluid entering via the first port has a high pressure, correspondingly the fluid in the second cavity also has a high pressure, and a pressure in the third cavity in communication with the third port is small, thus the differential pressure acting on the annular outer bottom surface applied by the fluid is large, and the relief ring 7 compresses the second elastic element 32 due to the pressure generated by the fluid. In the case that the pressure generated by the fluid exceeds a second preset value, the second elastic element 32 deforms, and the relief ring 7 moves downward till the relief ring 7 is separated from the first valve seat 51, and the first passage 1535 of the relief ring 7 is opened, thus the third flow passage allows circulation of fluid, and the fluid pressure in the thermostatic valve is reduced, thereby may prevent the pressure of the fluid in the system from being continuously increased.

The relief ring 7 has a part in a clearance fit with a part of the inner wall of the third cavity 153, and this part of the inner wall provides guiding and positioning functions, which may prevent the relief ring 7 from dislocating in the third cavity 153, and also facilitate resetting of the relief ring.

If the pressure of the fluid is reduced, the relief ring 7 may move upward under the action of the restoring force of the second elastic element 32, to close the first passage 1535.

In a specific use, the thermostatic valve is connected to an external cooling device and an oil tank of a gearbox by pipelines.

In the case that a temperature of the oil in the gearbox is over high, the heat sensitive material in the thermostatic actuating element expands due to being heated, and the thermostatic actuating element body moves towards the first valve opening till the second sealing portion closes the first valve opening.

At this moment, the second flow passage is cut off, and the first flow passage allows circulation of fluid, the oil with a high temperature coming from the gearbox enters the external cooling device via the thermostatic valve, and is cooled in the external cooling device, and then enters into the gearbox via the fourth flow passage.

In the case that the temperature of the oil in the gearbox is over low, the heat sensitive material in the thermostatic actuating element contracts, and the thermostatic actuating element body moves towards the second valve opening till the first sealing portion closes the second valve opening.

At this time, the first flow passage is cut off, and the second flow passage allows circulation of fluid, and the oil with a low temperature coming from the gearbox directly flows back to the gearbox via the thermostatic valve. The oil with the low temperature exchanges heat with the elements continuously generating heat in the gearbox. In the case that the temperature of the oil is increased to a certain temperature, the heat sensitive material in the thermostatic actuating element expands due to being heated, thus allowing the temperature of the oil to be controlled within a corresponding range.

In the case that the temperature of the cooling oil entering the thermostatic valve is over high and the pressure of the oil is excessively high, the heat sensitive material in the thermostatic actuating element expands due to being heated. The thermostatic actuating element body moves towards the first valve opening, till the second sealing portion seals the first valve opening, and the relief ring moves downward to compress the spring under the action of the cooling oil till the first passage is opened, the third flow passage allows circulation of fluid, and a part of the oil flows back to the gearbox via the bypass passages.

Figure 8:
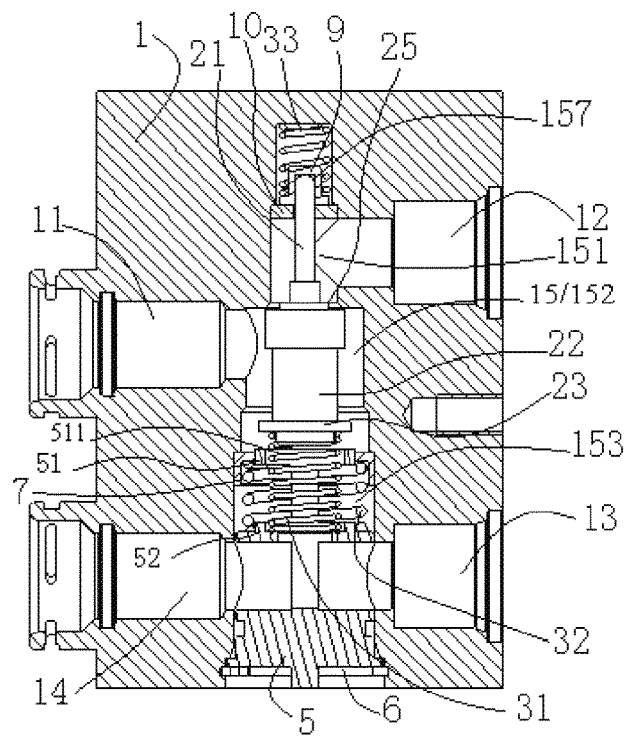
FIG. 8 is a sectional schematic view of a thermostatic valve according to another embodiment of the present application in the case that a second flow passage allows circulation of fluid.

FIG. 8 shows another embodiment, a main difference between this embodiment and the above first embodiment lies in that: an upper end, opposite to the cavity, of the valve body is a closed structure, and a fourth cavity 157 is further provided above the cavity. The several cavities from the open end to the inside of the valve body are narrowed in turn, a pressing block 10 is further provided at a portion where the first cavity is close to the fourth cavity, the fourth cavity 157 is provided with a spring seat 9 and a third elastic element 33, the third elastic element 33 has one end abutting against a bottom portion of the fourth cavity 157, and has another end abutting against a periphery of the spring seat 9, the third elastic element 33 and the spring seat 9 are confined in the fourth cavity via the pressing block 10 or a snap ring, and the third elastic element 33 here is in a compressed state. In this embodiment, leakage can be effectively prevented. Other structures and features in this embodiment may refer to the above embodiment.

Figure 9:
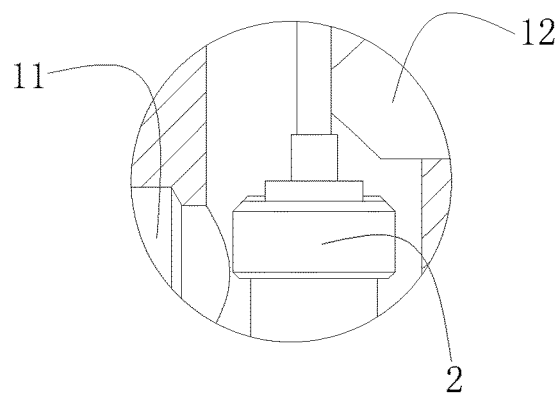
FIG. 9 is a partially sectional schematic view of a thermostatic valve according to another embodiment of the present application.

FIG. 9 shows another embodiment, which differs from the above embodiments mainly in that: the second valve opening is not provided in the cavity, and the thermostatic actuating element 2 cannot close the first flow passage. The first flow passage always allows circulation of fluid during the moving process of the thermostatic actuating element 2, and in such a case, the thermostatic actuating element 2 may not be provided with the first sealing portion. Other structures and features in this embodiment may refer to the above embodiments.

Figure 11:
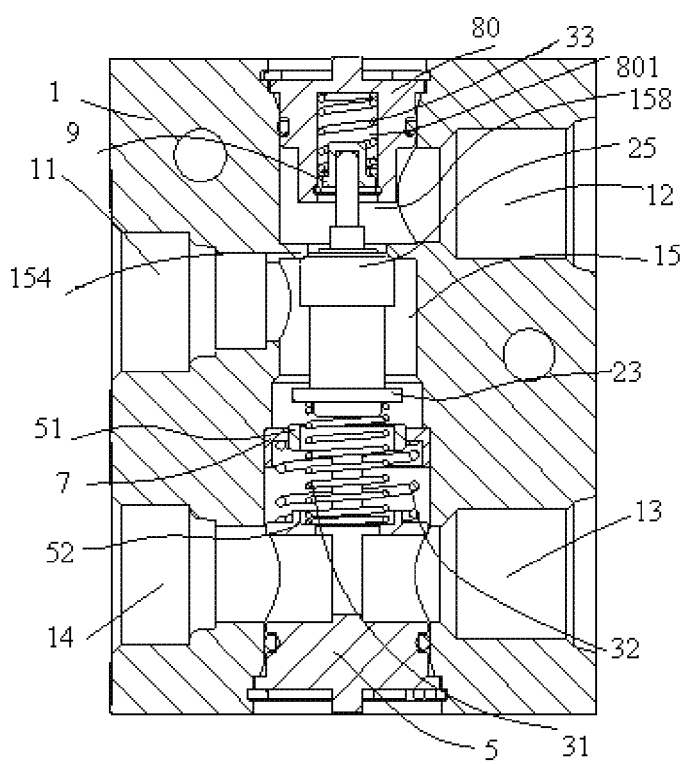
FIG. 11 is a partially sectional schematic view of a thermostatic valve according to another embodiment.

FIG. 11 shows another embodiment, which differs from the first embodiment mainly in the structure of the sealing cover 80, the structure of the valve body, a combining and fixing way of the sealing cover 80 and the valve body. An auxiliary cavity 158 is provided in the valve body 1 at an end opposite to the cap 5. The second port 12 is in communication with the auxiliary cavity 158, and a second valve opening 154 is provided between the auxiliary cavity 158 and the cavity 15. The piston 21 of the thermostatic actuating element or at least most part of the piston 21 is located in the auxiliary cavity 158. The sealing cover 80 is arranged in the valve body 1 by fitting a snap-fit component in a groove in an inner wall of the valve body, thus preventing the sealing cover 80 from escaping from the valve body 1, rather than being fixed by screw threads in the above embodiments. In addition, the inner wall portion of the valve body further has a step, to limit the movement of the sealing cover 80 inwards the auxiliary cavity of the valve body 1. Thus, the relative fixing of the sealing cover 80 in the auxiliary cavity is achieved, and the relative sealing between the sealing cover 80 and the inner wall portion of the valve body 1 is achieved by a sealing member. The sealing over 80 is further provided at an end facing towards the second valve opening 154 with an accommodating cavity 801, and an end of the accommodating cavity 80 facing towards the second valve opening is open. The third elastic element 33 and the spring seat 9 are arranged in the accommodating cavity 801. The third elastic member 33 and the spring seat 9 are arranged in a concave portion of the accommodating cavity by a clamp spring to realize the position limiting. The top portion of the piston 21 of the thermostatic actuating element extends into a hole of the cap-shaped spring seat to abut against the third elastic element. In this way, the manufacturing of the parts are more convenient, especially the manufacturing of the valve body, and the assembling is also relatively simple. In addition, the spring seat, the third elastic element may also be fixed in the accommodating cavity by other ways, for example, being tightly fitted in the accommodating cavity by a sealing cover to or being fixed to the accommodating cavity by welding.

Figure 12:
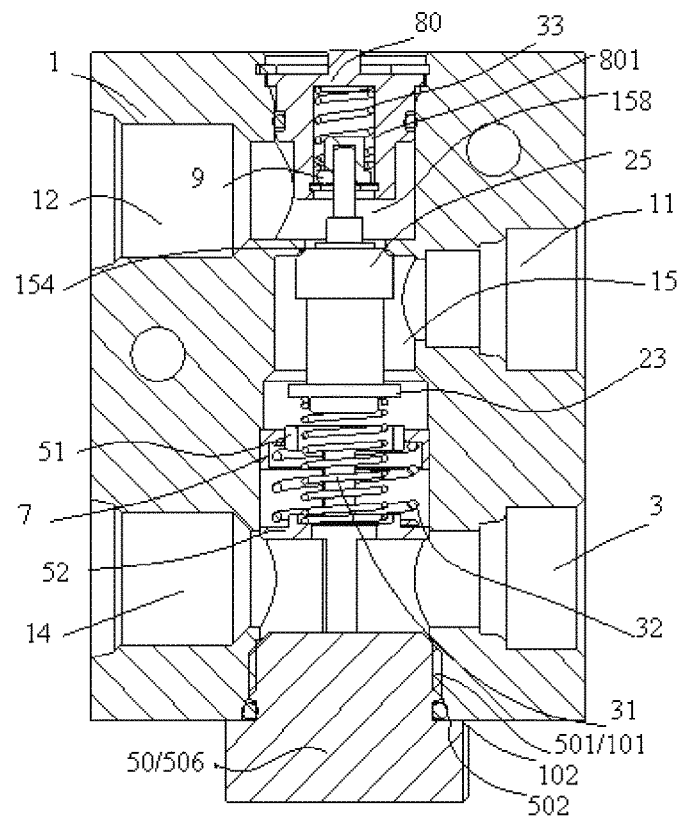
FIG. 12 is a partially sectional schematic view of a thermostatic valve according to another embodiment.

FIG. 12 shows still another embodiment, the technical solution of this embodiment differs from the embodiment in FIG. 11 mainly in that the structure of the cap and the manner of fixing the cap to the valve body are different. A cap 50 also includes a cap main body 506 configured to be fixed to the valve body. The cap main body 506 is provided with an external thread portion 501, and the valve body 1 is provided with an internal thread portion 101 in cooperation with the external thread portion 501 of the cap 50 at a portion, corresponding to the external thread portion 501, on an inner wall of the cavity, and the cap and the valve body are fixed to each other by a thread fit. The valve body 1 is provided with a position-limiting surface 102 configured to abut against the cap and limit a position of the cap, and the cap is also provided with a corresponding abutting surface 502. The abutting surface 502 abuts against the position-limiting surface 102 of the valve body to limit an axial position, thus ensuring a consistency of the product. Moreover, the abutting surface of the cap, and the position-limiting surface of the valve body may also be provided at other positions such as in the cavity, as long as a corresponding stepped position-limiting surface is provided in the cavity, and the cap is also correspondingly provided with an abutting surface in cooperation with the stepped position-limiting surface of the cap. In this way, the cap 50 and the valve body 1 are connected and fixed by screw threads, and not be fixed by the snap ring. Other structures and implementation ways may refer to other embodiments introduced above.

Figure 13:
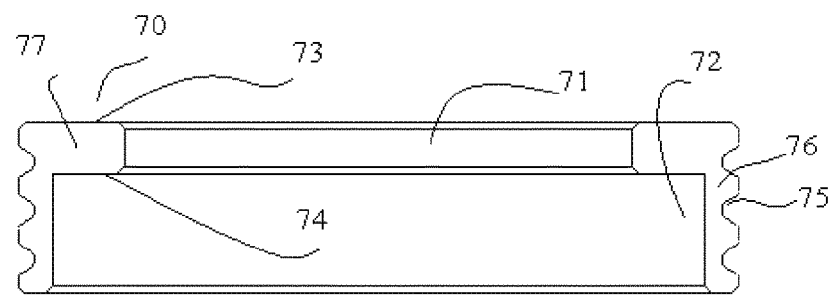
FIG. 13 is a sectional schematic view of another embodiment of the relief ring in the thermostatic valve.

In the above technical solutions, the outer wall portion of the relief ring for discharging a high pressure is of a cylinder-type structure, moreover the outer wall portion may be of a structure in FIG. 13. A relief ring 70 has a bottom portion 77 and a side wall portion 76, and also has a communicating hole 71 in cooperation with the outer wall of the first valve seat 51, and a spring receiving portion 72. The bottom portion 77 includes a top portion 73 facing to the second cavity, and a bottom surface 74 configured to abut against the second elastic element 32. In addition, at least one annular recess 75 may be provided may be provided in an outer wall of the side wall portion 76 of the relief ring 70. In this way, in practical use, the recess 75 between the relief ring 70 and an inner wall portion of the third cavity may be filled with fluid, and the fluid is used for lubrication, which allows the sliding between the relief ring and the inner wall of the third cavity to be reliable and stable.

Figure 14:
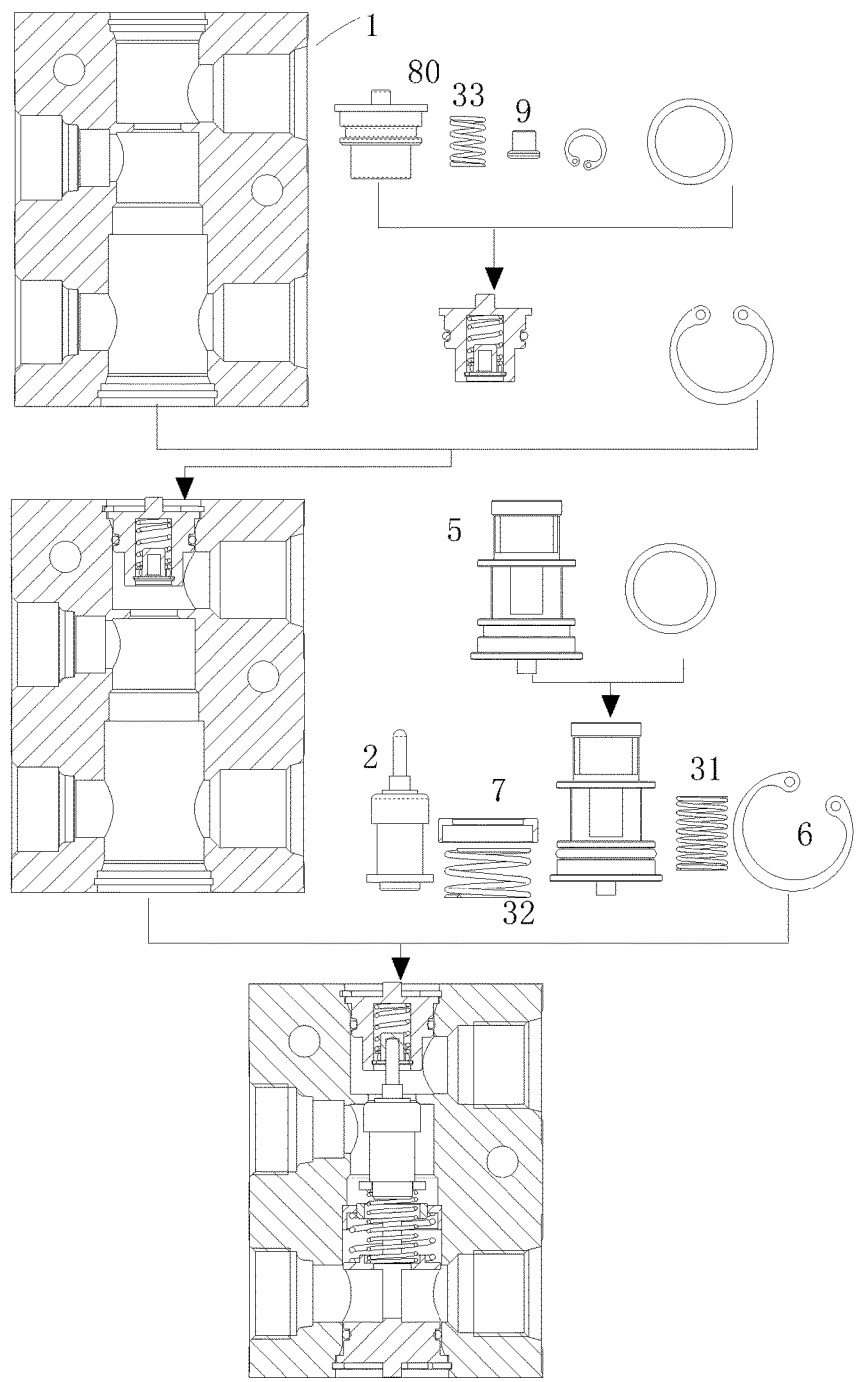
FIG. 14 is a schematic view showing the assembling process of the thermostatic valve in FIG. 11.

According to these technical solutions, the assembling is relatively convenient. The assembling is described taken the technical solution of the embodiment in FIG. 14 as an example hereinafter, and FIG. 14 is a schematic view showing the assembling process of the thermostatic valve in FIG. 11. The assembling process of the thermostatic valve includes the following steps.

(10) Manufacturing and preparing components and parts. The components and parts include a valve body, a sealing cover, various elastic elements, a sealing ring, a snap ring, a thermostatic actuating element, a relief ring, and a cap. The components and parts according to this technical solution includes a valve body 1, a sealing cover 80, a third elastic member 33, a spring seat 9, a sealing ring, a snap ring 6, a snap ring 61, a snap ring 62, a thermostatic actuating element 2, a first elastic element 31, a second elastic element 32, a relief ring 7, and a cap 5.

(20) Assembling the components, which includes assembling of the cap component, and assembling of a sealing cover component; in this technical solution, the assembling of the cap component includes assembling the sealing ring and the cap together; the assembling of the sealing cover component includes mounting the third elastic element 33 and the spring seat 9 into the cavity of the sealing cover 80, and using the snap ring 61 to fix the third elastic element 33 and the spring seat, and sleeving and fixing the sealing ring on the sealing cover to form the sealing cover component.

(30a) Mounting the sealing cover component into a corresponding auxiliary cavity of the valve body, and clamping and fixing the sealing cover by the snap ring 62; mounting the thermostatic actuating element and the relief ring into a cavity at another side of the valve body, and allowing one end corresponding to the piston of the thermostatic actuating element 2 to pass through the second valve opening and allowing a head portion of the piston to enter a hole of the spring seat 9; respectively disposing the first elastic element 31 and the second elastic element 32 at corresponding positions in the cap component, and then assembling the cap component with the partially assembled valve body, and then fixing the cap component by the snap ring 6, thus accomplishing the assembling of the thermostatic valve.

In addition, the above assembling step (30a) may also be as follows.

(30b) Mounting the thermostatic actuating element and the relief ring into the corresponding cavities in the valve body 1, and allowing one end corresponding to the piston of the thermostatic actuating element 2 to pass through the second valve opening; respectively disposing the first elastic element 31 and the second elastic element 32 in corresponding positions in the cap component, and assembling the cap assembly with the valve body 1, and then fixing the cap assembly by the snap ring 6; mounting the sealing cover component into the corresponding auxiliary cavity of the valve body, and allowing the hole of the spring seat 9 to cooperate with the position of the head portion of the piston, and clamping and fixing the sealing cover with the snap ring 62, thus realizing the assembling of the thermostatic valve.

In addition, the above assembling step (30a) may also be as follows.

(30c) Mounting the sealing cover component into the corresponding auxiliary cavity of the valve body, and clamping and fixing the sealing cover with the snap ring 62; if the sealing cover component and the valve body are fixed by screw threads, directly fitting and fixing the sealing cover component and the valve body by screw threads; then mounting the thermostatic actuating element into a cavity at another side of the valve body, and allowing one end corresponding to the piston of the thermostatic actuating element 2 to pass through the second valve opening and allowing a head portion of the piston to enter into a hole of the spring seat 9; and assembling the first elastic element and the relief ring, which includes mounting the first elastic element 31 into the cavity to sleeve the first elastic element 31 on an end portion of the thermostatic actuating element, and mounting the relief ring into the third cavity, and these two steps may be performed in a random sequence, or may be synchronously performed; and then mounting the second elastic element 32, to allow the second elastic element 32 to be located in the spring receiving portion of the relief ring, and assembling the cap component with the partially assembled valve body, to allow the first elastic element 31, the second elastic element 32 to be respectively located at an inner side and an outer side, of the first connecting column of the cap component, and then fixing and limiting the cap component by the snap ring; if the cap component and the valve body are fixed by screw threads, fixing the cap component and the valve body directly by screw threads.

In addition, in the assembling step (30c), the thermostatic actuating element, the first elastic element 31 and the relief ring may also be assembled first, and after the components at the side of the cavity, such as the cap, are assembled, the sealing cover component is then assembled.

The above embodiments are only specific embodiments of the present application, and are not intended to limit the present application in any form. The nouns of locality in the specification, such as up, down, left and right, are described according to the orientations in the figures, and should not be regarded as limitation to the orientation. Although the present application is disclosed hereinabove by the preferred embodiments, the preferred embodiments are not used to limit the present application. It should be understood by the skilled in the art that, many possible variations and modifications, or equivalent embodiments modified as equivalent variations, may be made to the technical solution of the present application based on the above disclosed technical contents without departing from the scope of the technical solution of the present application. Therefore, any simple variations, equivalent variations and modifications, made to the above embodiments according to the technical essence of the present application without departing from the content of the technical solution of the present application, are also deemed to fall into the scope defined by the technical solution of the present application.

What is claimed is:

1. A thermostatic valve, comprising a valve body with a cavity being provided in the valve body, and a thermostatic actuating element and a first elastic element mounted in the cavity, wherein one end of the thermostatic actuating element is supported on the first elastic element, the valve body is provided with at least three ports, and the three ports comprise a first port, a second port, and a third port; wherein
 a first valve seat is further provided in the cavity, an outer diameter of the first valve seat is less than an inner diameter of a portion of the cavity corresponding to the first valve seat, and there is a distance between an outer side of the first valve seat and an inner side of the cavity;
 the thermostatic valve further comprises a relief ring and a second elastic element in the cavity, one end of the second elastic element abuts against the relief ring, at least one first passage is formed between the first valve seat and the relief ring or between the inner side of the cavity and the relief ring, in the thermostatic valve, the first passage is unblocked or blocked by the movement of the relief ring, in the case that the first passage is blocked, the relief ring is sleeved on the first valve seat, and, in the case that the first passage is unblocked, the thermostatic valve forms a third flow passage, and the third flow passage comprises the first port, the first passage and the third port; and the thermostatic valve further comprises a first valve opening at the first valve seat, in the thermostatic valve, the first valve opening is opened or closed by the movement of the thermostatic actuating element, in the case that the thermostatic actuating element opens the first valve opening, a second flow passage allows circulation of fluid, and the second flow passage comprises the first port, the first valve opening and the third port.

2. The thermostatic valve according to claim 1, wherein the relief ring is provided with a spring receiving portion, the relief ring has a bottom portion and a side portion, the bottom portion comprises a bottom surface and a top portion at a back side of the bottom surface, one end of the second elastic element abuts against the bottom surface of the bottom portion of the relief ring, at least one part of the inner side of the cavity is in cooperation with a stroke of the relief ring, and the relief ring is in a sliding fit with the least one part of the inner side of the cavity;

the top portion of the relief ring is relatively closer to the first port than the bottom surface of the relief ring, in the case that the first valve opening is closed, a space of the cavity above the top portion of the relief ring is in communication with the first port, and a space where the second elastic element is located is in communication with the third port; and the thermostatic valve further comprises a cap, the cap is relatively fixed to the valve body, and at least half of the cap is located in the cavity, and another end of the first elastic element and another end of the second elastic element respectively abut against the cap.

3. The thermostatic valve according to claim 2, wherein the cavity comprises a second cavity and a third cavity, an inner diameter of the third cavity is greater than an inner diameter of the second cavity, the second cavity is relatively closer to the first port than the third cavity, the first port is in communication with a space where the second cavity is located, and a space where the third cavity is located is in communication with the third port;

a step is formed between the second cavity and the third cavity, all or at least a part of the relief ring, at least a part of the first valve seat, and at least a part of the second elastic element are arranged in the third cavity, in the case that the relief ring abuts against the step, the first passage is blocked; and an inner side portion of the third cavity or an outer side portion of the relief ring is provided with at least one recess in communication with the third port, in the case that the relief ring does not abut against the step, and there is a distance between the relief ring and the step, the first passage is unblocked, and the first port is in communication with the third port via the recess.

4. The thermostatic valve according to claim 2, wherein the cavity comprises a second cavity and a third cavity, an inner diameter of the third cavity is greater than an inner diameter of the second cavity, the second cavity is closer to the first port than the third cavity, the first port is in communication with a space where the second cavity is located, and a space where the third cavity is located is in communication with the third port;

a step is formed between the second cavity and the third cavity, all or at least a part of the relief ring, at least a part of the first valve seat, and at least a part of the second elastic element are arranged in the third cavity, and in the case that the relief ring abuts against the step, the first passage is blocked;

the bottom portion of the relief ring is further provided with a communicating hole, and the communicating hole is in a sliding fit with the first valve seat, in the case that the relief ring abuts against the step, the relief ring is sleeved on the first valve seat, and a height H1 of the first valve seat in cooperation with the relief ring is smaller than a slidable stroke H2 of the relief ring along an inner wall of the third cavity; and in the case that a differential pressure between an upper side pressure and a lower side pressure of the relief ring causes a pressure acted on the relief ring to exceed an elastic force of the second elastic element, the relief ring moves towards the third port, and allows the bottom portion of the relief ring to leave the first valve seat, the first passage is unblocked, and the first port is in communication with the third port via the first passage and the first communicating hole.

5. The thermostatic valve according to claim 2, wherein the cavity comprises a second cavity and a third cavity, an inner diameter of the third cavity is greater than an inner diameter of the second cavity, the second cavity is closer to the first port than the third cavity, the first port is in communication with a space where the second cavity is located, and a space where the third cavity is located is in communication with the third port;

a step is formed between the second cavity and the third cavity, all or at least a part of the relief ring, at least a part of the first valve seat, and at least a part of the second elastic element are arranged in the third cavity, in the case that the relief ring abuts against the step, the first passage is blocked, and the relief ring is sleeved on the first valve seat;

the cavity has an open end, and the open end is closer to the third port than the first port, the open end of the cavity is sealed by the cap that is relatively fixedly mounted, or the open end of the cavity is sealed by the cap and a sealing ring which are relatively fixedly mounted, the cap comprises the first valve seat, a supporting seat and a cap main body, the supporting seat is located between the first valve seat and the cap main body, the cap main body is configured to cooperate with an open end of the valve body for sealing; and at least one first connecting portion is further provided between the first valve seat and the supporting seat, and at least one passage configured to communicate the third cavity with the third port, and a second connecting portion configured to connect the supporting seat and the cap main body are further provided between the supporting seat and the cap main body, the end of the first elastic element and the end of the second elastic element abut against the cap by abutting against the supporting seat of the cap.

6. The thermostatic valve according to claim 5, wherein an upper end surface, facing towards the first valve seat, of the supporting seat comprises a first supporting surface and a second supporting surface, the second supporting surface is located at an outer side of the upper end surface, and the first supporting surface is located at an inner side of the second supporting surface, the at least one first connecting portion is located between the first supporting surface and the second supporting surface, the first elastic element abuts against the first supporting surface, the second elastic element abuts against the second supporting surface, the supporting seat is further provided with a through hole running through an upper end surface of the supporting seat, an inner diameter of the through hole is smaller than an outer diameter of the first elastic element, and the outer diameter of the first elastic element is smaller than an inner diameter of the first valve opening.

7. The thermostatic valve according to claim 6, wherein the thermostatic valve is further provided with a third elastic element, and two ends of the thermostatic actuating element respectively abut against the third elastic element and the first elastic element; the thermostatic actuating element comprises a thermostatic actuating element body and a piston, one end of the piston directly or indirectly abuts against the third elastic element, and the thermostatic actuating element body directly or indirectly abuts against the first elastic element.

8. The thermostatic valve according to claim 7, wherein an auxiliary cavity is provided in the valve body at a side opposite to the cavity, and the valve body is provided with a hole between the cavity and the auxiliary cavity, a top portion of the piston extends from the cavity into the auxiliary cavity via the hole; and in a direction from an open end of the auxiliary cavity to an inside, the thermostatic valve is provided in the auxiliary cavity with a sealing cover, the third elastic element and a spring seat in turn, the spring seat is of a hollow-cylinder-shaped structure with an extension, and is sleeved on an end of the top portion of the piston extending into the auxiliary cavity, and the end of the top portion, extending into the auxiliary cavity, of the piston is located in an inner cavity of the spring seat, the third elastic element has one end abutting against the sealing cover, and another end abutting against the extension of the spring seat, and the third elastic element is in a compressed state.

9. The thermostatic valve according to claim 5, wherein the first valve seat is approximately of an annulus sleeve structure, and at least a part of a periphery surface of the first connecting portion has a same outer diameter as a periphery of the first valve seat, or a projection of at least a part of the periphery of the first connecting portion in the direction of the first valve opening overlaps with a projection of the periphery of the first valve seat; the second elastic element is located at an outer side of the first connecting portion, and the first elastic element is located at an inner side of the first connecting portion.

10. The thermostatic valve according to claim 5, wherein the valve body further comprises a first cavity, the second cavity is located between the first cavity and the third cavity, the inner diameter of the second cavity is greater than an inner diameter of the first cavity, the first cavity is in communication with the second port, a second valve opening is provided between the first cavity and the second cavity, in the thermostatic valve, the second valve opening is opened or closed by movement of the thermostatic actuating element, and in the case that the thermostatic actuating element opens the second valve opening, the first port is in communication with the second port via the second valve opening to form a first flow passage.

11. The thermostatic valve according to claim 10, wherein the valve body further comprises a fourth cavity, the first cavity is located between the second cavity and the fourth cavity, the third cavity, the second cavity, the first cavity and the fourth cavity are arranged from the open end of the cavity to an inside of the cavity in turn and inner diameters of the third cavity, the second cavity, the first cavity, and the fourth cavity are reduced in order, the fourth cavity is provided with a spring seat and a third elastic element, and the spring seat is of a hollow-cylinder-shaped structure with an extension, the third elastic element has one end abutting against a bottom portion of the fourth cavity, and another end abutting against the extension of the spring seat, the third elastic element and the spring seat are fixed in the fourth cavity via a pressing block or a snap ring, and the third elastic element is in a compressed state.

12. The thermostatic valve according to claim 10, wherein the thermostatic actuating element further comprises a first sealing portion configured to open or close the second valve opening, and a second sealing portion configured to open or close the first valve opening, an outer diameter of the first sealing portion is greater than an inner diameter of the second valve opening, and an outer diameter of the second sealing portion is greater than an inner diameter of the first valve opening, the first sealing portion is closer to the piston than the second sealing portion; and the first sealing portion is fixedly mounted on an outer wall of the thermostatic actuating element body or is formed integrally with the outer wall of the thermostatic actuating element body; the second sealing portion is fixedly mounted on the outer wall of the thermostatic actuating element body or is formed integrally with the outer wall of the thermostatic actuating element body.

13. The thermostatic valve according to claim 2, wherein along an axial direction of the thermostatic actuating element, an upper end portion of the first valve seat facing towards the thermostatic actuating element protrudes above the top portion of the bottom portion of the relief ring facing towards the thermostatic actuating element; the side wall portion of the relief ring is in a sliding fit with the inner wall of the cavity, and the relief ring is provided at a center of the bottom portion with a communicating hole, and the communicating hole is greater than an outer diameter of a part of the first valve seat in cooperation with the relief ring by a degree large enough to allow the relief ring to be in a sliding fit with the first valve seat.

14. The thermostatic valve according to claim 2, wherein the valve body is provided with an auxiliary cavity at a side opposite to the cavity, and the valve body is provided with a hole between the cavity and the auxiliary cavity, the thermostatic actuating element comprises a piston, and a top portion of the piston extends from the cavity into the auxiliary cavity via the hole;

the valve body is provided with a second valve opening between the cavity and the auxiliary cavity, the thermostatic actuating element is provided with a second sealing portion in cooperation with the second valve opening, and the second port is in communication with the auxiliary cavity; and the thermostatic valve further comprises a sealing cover, a third elastic element, and a spring seat, the sealing cover is further provided, in a direction towards the cavity, with an accommodating portion which is sunken inward, the third elastic element and the spring seat are located in the accommodating portion, the spring seat is of a hollow-cylinder-shaped structure with an extension, an end of the top portion, extending into the auxiliary cavity, of the piston extends into the accommodating portion, the spring seat is sleeved on the end of the top portion of the piston extending into the auxiliary cavity, the third elastic element has one end abutting against a bottom portion of the accommodating portion of the sealing cover, and another end abutting against the extension of the spring seat, and the third spring element is in a compressed state.

15. The thermostatic valve according to claim 2, wherein the side wall portion of the relief ring is in a sliding fit with the inner wall of the cavity, and a communicating hole is provided at a center of, the bottom portion of the relief ring, the communicating hole is slightly greater than an outer diameter of a part of the first valve seat in cooperation with the relief ring to allow the relief ring to be in a sliding fit with the first valve seat, the relief ring is further provided with at least one annular recess at an outer wall of the side wall portion, and there is a distance between the recess of the relief ring and an inner wall portion of the cavity corresponding to the recess.

16. The thermostatic valve according to claim 2, wherein the cap comprises a cap main body configured to be fixed to the valve body, the cap main body is provided with an external thread portion, the valve body is provided at the inner wall of the cavity with an internal thread portion in cooperation with the external thread portion of the cap, the cap and the valve body are fixed by a thread fit, the valve body is provided with a position-limiting surface configured to abut against and position the cap, the cap is also provided with a corresponding abutting surface, the abutting surface of the cap abuts against the position limiting surface of the valve body; and another end of the first elastic element and another end of the second elastic element abut against the cap.

17. The thermostatic valve according to claim 14, wherein the cap comprises a cap main body configured to be fixed to the valve body, the cap main body is provided with an external thread portion, the valve body is provided at the inner wall of the cavity with an internal thread portion in cooperation with the external thread portion of the cap, the cap and the valve body are fixed by a thread fit, the valve body is provided with a position-limiting surface configured to abut against and position the cap, the cap is also provided with a corresponding abutting surface, the abutting surface of the cap abuts against the position limiting surface of the valve body; and another end of the first elastic element and another end of the second elastic element abut against the cap.

18. The thermostatic valve according to claim 5, wherein along an axial direction of the thermostatic actuating element, an upper end portion of the first valve seat facing towards the thermostatic actuating element protrudes above the top portion of the bottom portion of the relief ring facing towards the thermostatic actuating element; the side wall portion of the relief ring is in a sliding fit with the inner wall of the cavity, and the relief ring is provided at a center of the bottom portion with a communicating hole, and the communicating hole is greater than an outer diameter of a part in cooperation with the relief ring, of the first valve seat to allow the relief ring to be in a sliding fit with the first valve seat.

19. The thermostatic valve according to claim 5, wherein the valve body is provided with an auxiliary cavity at a side opposite to the cavity, the valve body is provided with a hole between the cavity and the auxiliary cavity, the thermostatic actuating element comprises a piston, and a top portion of the piston extends from the cavity into the auxiliary cavity via the hole;

the valve body is provided with a second valve opening between the cavity and the auxiliary cavity, the thermostatic actuating element is provided with a second sealing portion in cooperation with the second valve opening, and the second port is in communication with the auxiliary cavity; and the thermostatic valve further comprises a sealing cover, a third elastic element, and a spring seat, the sealing cover is further provided, in the direction towards the cavity, with an accommodating portion which is sunken inward, the third elastic element and the spring seat are located in the accommodating portion, the spring seat is of a hollow-cylinder-shaped structure with an extension, an end of the top portion of the piston extending into the auxiliary cavity extends into the accommodating portion, the spring seat is sleeved on the end of the top portion of the piston extending into the auxiliary cavity, the third elastic element has one end abutting against a bottom portion of the accommodating portion of the sealing cover, and another end abutting against the extension of the spring seat, and the third spring element is in a compressed state.

20. The thermostatic valve according to claim 5, wherein the side wall portion of the relief ring is in a sliding fit with the inner wall of the cavity, and a communicating hole is provided at a center of the bottom portion of the relief ring, the communicating hole is slightly greater than an outer diameter of a part of the first valve seat in cooperation with the relief ring to allow the relief ring to be in a sliding fit with the first valve seat, the relief ring is further provided with at least one annular recess at an outer wall of the side wall portion, and there is a distance between the recess of the relief ring and an inner wall portion of the cavity corresponding to the recess.

21. The thermostatic valve according to claim 5, wherein the cap comprises a cap main body configured to be fixed to the valve body, the cap main body is provided with an external thread portion, the valve body is provided at the inner wall of the cavity with an internal thread portion in cooperation with the external thread portion of the cap, the cap and the valve body are fixed by a thread fit, the valve body is provided with a position-limiting surface configured to abut against and position the cap, the cap is also provided with a corresponding abutting surface, the abutting surface of the cap abuts against the position limiting surface of the valve body; and another end of the first elastic element and another end of the second elastic element abut against the cap.

* * * * *

UNITED STATES PATENT AND TRADEMARK OFFICE
CERTIFICATE OF CORRECTION

PATENT NO. : 10,241,525 B2
APPLICATION NO. : 15/015450
DATED : March 26, 2019
INVENTOR(S) : Haoming Qui et al.

It is certified that error appears in the above-identified patent and that said Letters Patent is hereby corrected as shown below:

In the Claims

At Column 17, Claim 10, Line 56-57, please delete "actuating".

Signed and Sealed this
Twenty-fifth Day of June, 2019

Andrei Iancu
*Director of the United States Patent and Trademark Office*